United States Patent Office 3,163,594
Patented Dec. 29, 1964

3,163,594
COLOR IMPROVEMENT OF HYDROCARBON
OIL FRACTIONS
William Floyd Arey, Jr., Baton Rouge, and William Judson Mattox, East Baton Rouge, La., assignors to Esso Research and Engineering Company, a corporation of Delaware
No Drawing. Filed Apr. 5, 1962, Ser. No. 185,193
25 Claims. (Cl. 208—264)

The present invention is concerned with improving the color properties of various hydrocarbon fractions. More particularly, it deals with means for increasing color stability of hydrocarbon fractions by hydrotreating with specific metal exchanged alumino-silicate zeolites, thereby obtaining color improvement with little or no hydrogen consumption, cracking or hydrogenation of aromatics.

The problem of improving the color stability and initial color properties of various hydrocarbon fractions has long plagued the petroleum industry. Numerous methods have been advanced for solving this problem, among them hydrofining. With conventional hydrofining catalyst, such as, for example, cobalt molybdate or supported platinum, etc., while some improvement has been obtained in color, often the color stability is less than desired. Additionally, there is significant hydrogen consumption and cracking as well as hydrogenation of aromatic constituents of the hydrocarbon fractions, all of which are considered to be undesirable. In accordance with the present invention, means are taught for improving the color and color stability of various hydrocarbon fractions with little or no hydrogen consumption, cracking of products or hydrogenation of aromatics.

More particularly, in accordance with the present invention, a hydrocarbon fraction is subjected to a hydrotreatment in the presence of a crystalline alumino-silicate molecular sieve which, via exchange or otherwise, contains a member of the group consisting of iron or Group II–A metals. Examples of suitable Group II–A metals are magnesium, calcium, strontium, and barium. In general, the Group II–A or iron-containing alumino-silicate molecular sieves have an effective pore diameter within the range of 4 to 15 A.; with the large pore, e.g. 6 to 15 A., sieves being preferred. However, exchanged A-type alumino-silicate zeolites which, in the calcium form, have pore diameters of only 5 A. (alumina to silica ratios in the zeolite of about 1.8 to 2.3) may also be used, particularly in the iron exchanged form. The catalyst employed in the present invention may be formed in accordance with the procedures discussed in detail in U.S. Patent 2,971,903.

As employed in the present specification, the term "large pore molecular sieves" refers to metallic alumino-silicate zeolites characterized by their highly ordered crystalline structure and having pores of nearly uniform dimensions in the range of about 6 to 15 Angstroms. These crystalline molecular sieves have an alumino-silica anionic cage structure in which the alumina and silica tetrahedra are intimately connected to each other. Metal cations or hydrogen are distributed throughout the structure to maintain electrical neutrality. The highly ordered dispersion of the silica and alumina tetrahedra makes for a large number of active sites, and the uniform pore openings of 6 to 15 Angstrom units allow for easy ingress of various hydrocarbon feed types as well as egress of the reaction products which may be formed by contact with the sieves.

Such large pore molecular sieves have generally been referred to as "type 13" molecular sieves. A naturally occurring example thereof is the mineral faujasite. Synthetically produced alumino-silicates have been termed in the industry "13X" and "13Y" molecular sieves. The chemical formula of the anhydrous, large pore X- and Y- type zeolites, expressed in the terms of mols, may be represented as:

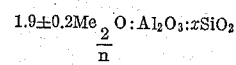

where Me is one or more metal cations, $n$ is its valence, and $x$ is in integer from 2 to 12, preferably 4 to 6. The metal cation is preferably an alkali metal such as sodium or potassium or an alkaline earth metal such as calcium. Normally, it is sodium. The smaller pore zeolites differ principally in having silica/alumina ratio of 1.8 to 2.3. After exchange with iron or Group II–A metals, Me will be principally iron or a Group II–A metal.

Generally these large pore crystalline zeolites are prepared by having present in the reaction mixture, $Al_2O_3$ as sodium aluminate, alumina sol and the like; $SiO_2$ as sodium silicate and/or silica gel and/or silica sol; and alkaline hydroxide, either free or in combination with the above components. Careful control is kept over the pH, the sodium ion concentration of the mix as well as the proportions of silica to alumina and soda to silica, the crystallization period, etc., all in a manner known per se. A general scheme for preparing large pore crystalline alumino-silica zeolites would be as follows:

Colloid silica, such as commercial Ludox, is mixed with a solution of sodium hydroxide and sodium aluminate at ambient temperatures. The reaction mixture may be allowed to digest at ambient temperatures for periods of up to 40 hours or more, e.g., 24 hours. The reaction mixture is then heated to 180° to 250° F., preferably 200° to 220° F., for a period of 24 to 200 hours or more, preferably 50 to 100 hours in order to effect crystallization. The crystalline metallic alumino-silicate may then be decanted and washed.

The following table sets forth a summary of the molar ratio of reactants normally employed in the synthesis of such large pore molecular sieves.

Table I

| Reactants (Mole Ratio) | General Range | Preferred Range for X-Type | Preferred Range for Y-Type |
|---|---|---|---|
| $Na_2O/SiO_2$ | 0.6–2 | 0.7–1 | 0.2–0.8, especially 0.28–0.45. |
| $SiO_2/Al_2O_3$ in reaction mixture. | 2.2–40 | 2.5–5 | 8–30, especially 10–30. |
| $H_2O/Na_2O$ | | | 20–60, especially 30–50. |
| $SiO_2/Al_2O_3$ in crystalline zeolite product. | 2–10 | 2–3 | 4–6, especially 5–6. |

The catalysts employed in the present invention are formed by exchanging the crystalline alumino-silicate materials with metal salts solutions of Group II–A metals or iron, normally at temperatures of 60° to 150° F. In general, about two-thirds of the soda, which may originally be present in the sieve, is exchanged with the catalytic metal so that the ultimate Group II–A or iron alumino-silicate catalyst will contain at least 1 to 2 wt. percent, preferably 3 to 20 wt. percent of these metals as the catalytic agent. Examples of suitable salt solutions for obtaining the present catalyst are the following: $MgSO_4$, $Mg(NO_3)_2$, $MgCl_2$, $CaCl_2$, $SrCl_2$, $BaCl_2$, $FeSoO_4$, $FeCl_2$, etc. After base exchange with the metal salt solutions the resulting catalyst is then normally washed free of soluble ions and subjected to drying at temperatures of 225° to 700° F. for periods of 1 to 12 hours. It may thereafter be calcined at a temperature of 750° to 1000° F. for 1 to 2 hours.

The present invention is applicable to a wide variety of hydrocarbon oil fractions. Normally, such fractions will boil in the range of 350° to 900° F., preferably 400° to 800° F., and is generally largely saturated in nature.

Examples of hydrocarbon oil fractions which may be treated in accordance with the present invention are shale oil, raw cycle oil, catalytic heating oil, thermal and catalytic naphthas. The hydrotreatment of the hydrocarbon fractions may be carried out in either liquid or vapor phase, in the presence of a hydrogen-containing gas. In general, reaction temperatures of 500° to 900° F., preferably 600° to 800° F., and pressures of 50 to 2000 p.s.i., preferably 200 to 1500 p.s.i., are employed. Space velocities normally range from 0.01 to 10 v./v./hr. with 500 to 10,000, preferably 2,000 to 8,000 s.c.f. of hydrogen being present in the reaction zone per barrel of feed to be treated. The catalyst may be present in the form of a fluidized bed of materials, a fixed bed or a moving bed type of catalyst operation. By operating in accordance with the present invention, good color stability may be obtained, e.g., the product has a color hold which is generally at least 65% of its initial Tag-Robinson color rating and generally is 80 to 95+% of its initial Tag Robinson color rating. Hydrogen consumption is normally less than 50 to 100 s.c.f. per barrel of feed with the percentage of hydrocracking being normally less than about 10% (based on feed).

The fact that the present Group II-A metal aluminosilicate zeolite catalyst substantially improves the color properties of hydrocarbon fractions via a hydrogen treatment is indeed surprising. The materials of Group II-A have in general not been considered to have hydrogenating activity. Moreover, since magnesium is a known cracking component, the fact that the present Group II-A metals exhibit little cracking during the present hydrotreatment is indeed unexpected. Similarly, although iron is a known hydrogenating agent, other members of Group VIII; i.e., cobalt and nickel, fail to give the present degree of color improvement without hydrocracking and large hydrogen consumption.

Further demonstrative of the uniqueness of the present hydrotreatment is the fact that Group II-A or iron exchanged amorphous alumino-silicates fail to provide the substantial color improvement offered by the practice of the present invention wherein highly uniform crystalline alumino-silicate zeolites are employed. Additionally, the present hydrotreatment gives substantially better results than the use of conventional hydrogenating materials such as cobalt molybdate at the same conditions of reaction. The present invention gives better results than these standard hydrogenating reactions in that hydrogen consumption is minimized at 50 to 100 c.f./b. or less (as compared to 600 c.f.//b. or more) and with very little or no cracking to lower boiling hydrocarbons.

The various modifications of the present invention will be made more clearly apparent by reference to the following description and accompanying examples.

In all of the following examples the catalytic zeolite was obtained by base exchanging the sodium form of an alumino-silicate zeolite of the type indicated hereafter with a metal salt solution of the metal to be added to the crystalline zeolite. Base exchange was conducted at temperatures of 80° to 150° F. Thereafter the exchanged sieve was washed free of soluble ions, dried for 6 to 8 hours at 250° F. and then calcined at 1000° F. for 2 hours.

The following table sets forth the particular salt solution employed for the particular component to be added.

*Table II*

| Catalytic metal to be added: | Salt solution |
|---|---|
| Iron | $FeSO_4$ |
| Nickel | $NiCl_2$ |
| Copper | $CuSO_4$ |
| Magnesium | $MgCl_2$ |
| Strontium | $SrCl_2$ |

Base exchange was conducted for sufficiently long time and for a sufficient number of exchanges so that the alumino-silicate had the weight percent of catalytic metal indicated in the following tables.

Initial color reported below refers to the color of the oil after treatment (if any) and is reported in units of Tag-Robinson color. Color hold was determined by saturating the oil with air, heating for 16 hours at 210° F., and then re-determining the Tag-Robinson color, this second color value being the "color hold."

Percentage hydrocracking was determined as the weight percent of hydrocarbons boiling below the initial boiling point of the feed. Similarly, hydrogen consumption was determined based on the hydrogen content of the treated oil.

EXAMPLES 1 AND 2

The following data illustrate the superior qualities of Group II-A metals exchanged with crystalline alumino silicate molecular sieves, particularly large pore zeolites, when used as hydrotreating catalysts. The feed was a 29.4° API gravity raw cycle oil having a boiling range of 402° to 612° F. Reaction conditions are set forth below in Table III. A comparison is shown between Group II-A metals; e.g., magnesium and strontium which have been exchanged with large pore crystalline molecular sieves and a similar zinc and nickel catalyst. Additionally, a comparison with magnesium exchanged A-type crystalline molecular sieve and an amorphous magnesium alumino-silicate prepared from Aridzone. Aridzone is a commercial hydrous sodium alumino-silicate marketed for water softening and related uses. The sample employed in the present test analyzed as: 13.0 weight percent $Na_2O$, 63.2 weight percent silicon dioxide and 23.8 weight percent aluminum oxide.

After hydrotreating the same oil fraction using each of the above-described catalytic materials, the following results were obtained.

*Table III*

HYDROTREATING OF RAW CYCLE OIL
[35 p.p.m. nitrogen; 0.28% sulfur, 700° F.; 1,000 p.s.i. hydrogen pressure]

| Catalyst | | | | Product Color (TR)[1] | | Refractive Index of Oil, 25° C. | Hydrogen Consumption, CF/B[2] | Cracked Products, Percent |
|---|---|---|---|---|---|---|---|---|
| Type | Wt. Percent Catalytic Metal | $SiO_2/Al_2O_3$, Mol Ratio | Crystallinity | Initial | Color Hold | | | |
| | | | | 16 | 2¼ | 1.4950 | | |
| Mg-Y | 3.3% Mg | 4.3 | Crystalline | 19¼ | 18¼ | | 0 | 8 |
| Mg-X | 3.5% Mg | 2.5 | ---do--- | 25 | 25 | 1.4900 | 40 | 0 |
| Mg-A | 3.2% Mg | 2.0 | ---do--- | 19¾ | 17½ | | | 0 |
| Mg-Aridzone | 6.3% Mg | 4.5 | Amorphous | 18¼ | 15¼ | | | 0 |
| Sr-X | 19.1% Sr | 2.5 | Crystalline | 24 | 16¾ | 1.4912 | 50 | 0 |
| Zn-X | 13.1% Zn | 2.5 | ---do--- | 18½ | | 1.4706 | 398 | 15 |
| Ni-X | 13.5% Ni | 2.5 | ---do--- | 17½ | 17½ | 1.4790 | 612 | 20 |

[1] Tag-Robinson Color. [2] From Hydrogen Content of Oil.

As illustrated by the above results, the use of Group II–A metal, e.g., magnesium or strontium, alumino-silicates (crystalline) showed outstanding advantages in color improvement and color stability. This was obtained simultaneously with greatly reduced hydrogen consumption as compared with zinc or nickel alumino-silicates as well as substantially no cracking. Additionally, no appreciable hydrogenation of aromatics occurs in the practice of the present invention as shown by the only slight decrease in refractive index of the oil. Thus, the data show Group II–A metals are specifically desirable and that the broad class of metal exchanged crystalline zeolites do not give the advantages of the present invention.

The data show that Group II–A metals on amorphous alumino-silicates fail to give the exceptionally high color stability offered by the practice of the present invention. The use of a 4 A. molecular sieve exchanged with magnesium gives quality improvements but not as good as obtained with large pore zeolites. These latter two materials are particularly deficient in that they give little sulfur or nitrogen removal in contrast to the normal 50+% removal of these constituents offered by preferred catalysts of the present invention, although substantial color and color stability improvements are effected.

EXAMPLES 3 TO 5

In a similar manner the raw cycle oil described above was hydrotreated in the presence of various iron-containing alumino-silicates and the results of this treatment compared to the use of either copper or nickel exchanged crystalline sieves or iron exchanged with an amorphous alumino-silicate. The amorphous alumino-silicate was the same as that described in Examples 1 and 2 as was the A-type crystalline alumino-silicate. Results are set forth in Table IV.

It is also noted that the 13% of cracked products produced with the iron-13Y catalyst appears to have resulted from catalytic cracking rather than hydrocracking, which is in keeping with no observable hydrogen consumption for the operation. While the nickel and copper catalysts did give substantial improvements in color, the hydrogen consumption accompanying their use was excessive and amounted to 4 to 10 times or more the consumption observed by the use of the present iron catalyst.

EXAMPLE 6

The raw cycle oil feed used in Examples 1 to 5 was treated with a cobalt molybdate-alumina catalyst at 650° F. under 1500 p.s.i.g. hydrogen pressure in a fixed bed type of operation. Hydrogen consumption amounted to 600 to 800 c.f.b. of oil feed. Some color improvement was effected but only to the level of about 12 to 15 Tag-Robinson. Thus, the properties of this standard hydrogenation type catalyst are less desirable for color and color stability improvements than those of the specific groups of crystalline alumino-silicates of this invention.

Various modifications may be made to the practice of the present invention. For example, slurry type contacting may be employed to treat various type oils followed by separation of the catalyst which is then used, without regeneration, to catalytically crack an oil fraction of comparable or higher boiling range. Such operation would be especially applicable when using alumino-silicate catalysts which contain Group II–A metals.

Having described the present invention, that which is sought to be protected is set forth in the following claims.

What is claimed is:

1. An improved means for enhancing the color properties of hydrocarbon fractions which comprises subjecting them to hydrotreating conditions at which substan-

Table IV

HYDROTREATING OF RAW CYCLE OIL
[35 p.p.m. nitrogen; 0.28% sulfur, 700° F.; 1,000 p.s.i. hydrogen pressure]

| Catalyst | | | | Product Color (TR) [1] | | Refractive Index of Oil, 25° C. | Hydrogen Consumption, CF/B [2] | Cracked Products, Percent |
| --- | --- | --- | --- | --- | --- | --- | --- | --- |
| Type | Wt. Percent Catalytic Metal | $SiO_2/Al_2O_3$, Mol Ratio | Crystallinity | Initial | Color Hold | | | |
| Fe-Y | 8.0% Fe | 4.3 | Crystalline | 16 | 2¼ | 1.4750 | | |
| Fe-X | 11.9% Fe | 2.5 | do | 19½ | 18½ | | Nil | 13 |
| Fe-A | 11.2% Fe | 2.0 | do | 24 | 20¾ | 1.4920 | 57 | 0 |
| Fe-Aridzone | 6.8% Fe | 4.5 | Amorphous | 21 | 18½ | | | 0 |
| Co-X | 12.5% Co | | | 17¾ | 13½ | | | 0 |
| Ni-X | 13.5% Ni | 2.5 | Crystalline | 17½ | 17½ | 1.4706 | 612 | 40 |
| Cu-X | 13.9% Cu | 2.5 | do | 17½ | 16¼ | 1.4790 | 216 | 20 |
| | | | | | | | | 10 |

[1] Tag-Robinson Color.  [2] From Hydrogen Content of Oil.

As shown, although various Group VIII metal alumino-silicates are known to have hydrogenation activity, only the iron crystalline alumino-silicate employed above gave outstanding and distinctive improvements in effecting color improvement and color stability. In addition, this material produced substantially no hydrocracking or hydrogen consumption. No appreciable hydrogenation of aromatics occurred as shown by only the slight decrease in refractive index. The superior qualities are in sharp contrast to those exhibited by copper, nickel, and cobalt large pore crystalline alumino-silicates under the same conditions, the latter materials showing 10 to 40% hydrocracking, high hydrogen consumption, and extensive aromatics hydrogenation.

It is also noted that in the case of employing iron, the effective pore diameter of the A-type crystalline alumino-silicate is in the lower ranges of permissible diameter. All of the crystalline iron alumino-silicates gave exceptional color improvement. The degree of color stability offered by the use of amorphous iron alumino-silicates is markedly inferior to the present catalyst.

tially no hydrogen consumption or cracking occurs, said conditions including a temperature of 500° to 900° F., in the presence of a crystalline metallic alumino-silicate zeolite catalyst having an effective pore diameter of 4 to 15 Angstroms and containing a member of the group consisting of Group II–A metals and iron.

2. The process of claim 1 wherein said catalyst has the empirical formula:

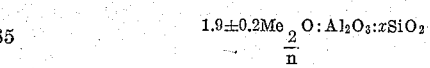

wherein Me is primarily a member of the group consisting of iron and Group II–A metals, n is its valence, and x is an integer from 2 to 12.

3. The improved process of claim 1 wherein said hydrocarbon fractions are hydrotreated at a temperature of 500° to 900° F. and said catalyst contains at least 1 wt. percent of catalytic metal selected from the group consisting of iron and Group II–A metals.

4. A process for improving the color properties of relatively saturated hydrocarbon oil fractions boiling in the range of 350° to 900° F. which comprises contacting said hydrotreating conditions at which substantially no hydrogen consumption or cracking occurs, said conditions including a temperature of 500° to 900° F., in the presence of a hydrogen-containing gas, with a metal exchanged crystalline alumino-silicate catalyst which may be represented by the following empirical formula:

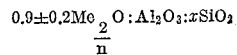

wherein Me is primarily a metal selected from the group consisting of iron and Group II–A metals, $n$ is its valence, and $x$ is an integer from 1.8 to 12.

5. The process of claim 4 wherein said catalyst contains at least 1 wt. percent of catalytic metal selected from the group consisting of iron and Group II–A metals.

6. The process of claim 5 wherein said catalyst contains magnesium.

7. The process of claim 5 wherein said catalyst contains strontium.

8. The process of claim 5 wherein said catalyst contains iron.

9. The process of claim 5 wherein said hydrotreated hydrocarbon fractions maintain at least 65% of its Tag-Robinson color upon being subjected to the color hold test.

10. A process for improving the color properties of hydrocarbon fractions with substantially no hydrogen consumption or hydrocracking which comprises subjecting said hydrocarbon fractions to temperatures of 500° to 900° F. in the presence of a hydrogen-containing gas and a base exchanged crystalline alumino-silicate catalyst which may be represented by the following empirical formula:

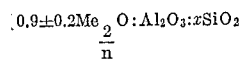

wherein Me is primarily a metal selected from the group consisting of Fe and Group II–A metals, $n$ is its valence and $x$ is an integer from 2 to 12.

11. The process of claim 2, wherein said catalyst contains 3 to 20 wt. percent of catalytic metal selected from the group consisting of iron and Group II–A metals.

12. The process of claim 11, wherein $x$ is an integer from 4 to 6.

13. The process of claim 10, wherein said catalyst contains 3 to 20 wt. percent of said metal.

14. The process of claim 13, wherein said hydrocarbon fractions boil in the range of 400 to 800° F. and wherein said hydrogen consumption is limited to less than 50 to 100 s.c.f./bbl. of feed, wherein the hydrocracking is limited to less than 10 wt. percent based on feed, and wherein the hydrotreated hydrocarbon fractions retain at least 65% of the initial Tag-Robinson color rating.

15. The process of claim 14, wherein $x$ is an integer from 4 to 6.

16. The process of claim 2, wherein $x$ is an integer from 4 to 6.

17. The process of claim 11, wherein said catalyst contains magnesium.

18. The process of claim 11, wherein said catalyst contains strontium.

19. The process of claim 11, wherein said catalyst contains iron.

20. A process for improving the color properties of relatively saturated hydrocarbon oil fractions boiling in the range of 350° to 900° F. which comprises contacting said hydrocarbon fractions, in the presence of a hydrogen-containing gas, with a metal exchanged crystalline alumino-silicate catalyst having the following empirical formula:

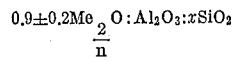

wherein Me is primarily a metal selected from the group consisting of iron and Group II–A metals, $n$ is its valence, and $x$ is an integer from 2 to 12, said catalyst containing at least 1 to 2 wt. percent of said metal, said contacting being performed at hydrotreating conditions at which at least 65% of the initial Tag-Robinson color rating of said fractions is retained, the hydrogen consumption is less than 50 to 100 s.c.f./bbl. of feed and the percentage of hydrocracking conversion to hydrocarbons boiling below the initial boiling point of said oil fractions is less than about 10 wt. percent based on feed, said hydrotreating conditions including a temperature of 500° to 900° F., a pressure of 50 to 2000 p.s.i., a space velocity of 0.01 to 10 v./v./hr. and a hydrogen rate of 500 to 10,000 s.c.f./bbl. of feed.

21. The process of claim 20, wherein said catalyst contains magnesium.

22. The process of claim 20, wherein said catalyst contains strontium.

23. The process of claim 20, wherein said catalyst contains iron.

24. The process of claim 20, wherein said catalyst contains 3 to 20 wt. percent of said metal.

25. A process for improving the color properties of relatively saturated hydrocarbon oil fractions boiling in the range of 400° to 800° F. which comprises contacting said hydrocarbon fractions, in the presence of a hydrogen-containing gas, with a metal exchanged crystalline alumino-silicate catalyst having the following empirical formula:

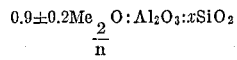

wherein Me is primarily a metal selected from the group consisting of iron and Group II–A metals, $n$ is its valence, and $x$ is an integer from 4 to 6, said catalyst containing 3 to 20 wt. percent of said metal, said contacting being performed at hydrotreating conditions at which at least 80% of the initial Tag-Robinson color rating of said fractions is retained, the hydrogen consumption is less than 50 to 100 s.c.f. per barrel of feed and the percentage of hydrocracking conversion to hydrocarbons boiling below the initial boiling point of said oil fractions is less than about 10 wt. percent based on feed, said hydrotreating conditions including a temperature of 600° to 800° F., a pressure of 200 to 1500 p.s.i., a space velocity of 0.01 to 10 v./v./hr., and a hydrogen rate of 2000 to 8000 s.c.f. per barrel of feed.

References Cited in the file of this patent
UNITED STATES PATENTS

| 2,971,903 | Kimberlin et al. | Feb. 14, 1961 |
| 2,971,904 | Gladrow et al. | Feb. 14, 1961 |
| 2,983,670 | Seubold | May 9, 1961 |
| 3,098,032 | Gladrow et al. | July 16, 1963 |